United States Patent
Lee

(10) Patent No.: US 10,621,706 B2
(45) Date of Patent: Apr. 14, 2020

(54) DEVICE FOR RECORDING INFORMATION ABOUT DEFECTIVE PIXELS, AND DEFECTIVE PIXEL VALUE CORRECTION DEVICE AND METHOD

(71) Applicant: Hanwha Techwin Co., Ltd., Seongnam-si (KR)

(72) Inventor: Chang Min Lee, Seongnam-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 0 days.

(21) Appl. No.: 16/182,086

(22) Filed: Nov. 6, 2018

(65) Prior Publication Data
US 2019/0087945 A1    Mar. 21, 2019

Related U.S. Application Data

(63) Continuation of application No. PCT/KR2016/012155, filed on Oct. 27, 2016.

(30) Foreign Application Priority Data

Oct. 14, 2016    (KR) .................. 10-2016-0133599

(51) Int. Cl.
*G06T 5/00* (2006.01)
*H04N 5/367* (2011.01)
(Continued)

(52) U.S. Cl.
CPC .............. *G06T 5/005* (2013.01); *H04N 5/367* (2013.01); *H04N 19/46* (2014.11); *H04N 19/59* (2014.11);
(Continued)

(58) Field of Classification Search
CPC ........ G06T 5/005; H04N 19/65; H04N 19/59; H04N 19/46; H04N 5/367; H04N 19/44;
(Continued)

(56) References Cited

U.S. PATENT DOCUMENTS 5,436,659 A  *  7/1995  Vincent .................. H04N 5/367
                                                    348/241
7,061,533 B1 *  6/2006  Urushiya ............... G01N 23/04
                                                    348/346
(Continued)

FOREIGN PATENT DOCUMENTS

JP          6-93757 B2    11/1994
JP          7-336605 A    12/1995
(Continued)

OTHER PUBLICATIONS

Petrichkovich Jaroslav Jaros (RU-2556885-C1), Jul. 2015 (Year: 2015).*

(Continued)

*Primary Examiner* — Timothy J Henn
(74) *Attorney, Agent, or Firm* — Sughrue Mion, PLLC

(57) ABSTRACT

An apparatus for correcting defective pixel values includes: an image sensor comprising a plurality of pixels; a data memory storing encoded location information about defective pixels, a location information decoder decoding the encoded location information, and a pixel corrector identifying the defective pixels from the pixels using the decoded location information, and interpolating pixel values of the defective pixels using pixel values of one or more neighboring pixels adjacent to each of the defective pixels.

20 Claims, 12 Drawing Sheets

(51) Int. Cl.
*H04N 19/46* (2014.01)
*H04N 19/59* (2014.01)
*H04N 19/65* (2014.01)
*H04N 17/00* (2006.01)
*H04N 19/182* (2014.01)
*H04N 19/44* (2014.01)

(52) U.S. Cl.
CPC .......... *H04N 19/65* (2014.11); *H04N 17/002* (2013.01); *H04N 19/182* (2014.11); *H04N 19/44* (2014.11)

(58) Field of Classification Search
CPC .... H04N 19/182; H04N 17/002; H04N 19/00; H01L 27/146
See application file for complete search history.

(56) References Cited

U.S. PATENT DOCUMENTS

2006/0170801 A1* 8/2006 Dennis ................. H04N 5/3454
348/294

2010/0007777 A1 1/2010 Walter et al.
2013/0265295 A1 10/2013 Ogawa

FOREIGN PATENT DOCUMENTS

| | | |
|---|---|---|
| JP | 2003-259381 A | 9/2003 |
| JP | 2007-129287 A | 5/2007 |
| KR | 10-2006-0041708 A | 5/2006 |
| KR | 10-2013-0102402 A | 9/2013 |

OTHER PUBLICATIONS

Search Report dated Jul. 17, 2017, issued by the International Searching Authority in counterpart International Patent Application No. PCT/KR2016/012155 (PCT/ISA/210).

Written Opinion dated Jul. 17, 2017, issued by the International Searching Authority in counterpart International Patent Application No. PCT/KR2016/012155 (PCT/ISA/237).

Communication dated Feb. 26, 2020, from the European Patent Office in counterpart European Application No. 16918906.5.

* cited by examiner

DEVICE FOR RECORDING INFORMATION ABOUT DEFECTIVE PIXELS, AND DEFECTIVE PIXEL VALUE CORRECTION DEVICE AND METHOD

CROSS-REFERENCE TO THE RELATED APPLICATION

This application is a continuation of International Application No. PCT/KR2016/012155, which was filed on Oct. 27, 2016, and claims priority from Korean Patent Application No. 10-2016-0133599, which was filed in the Korean Intellectual Property Office on Oct. 14, 2016, the disclosures of which are incorporated herein by reference in their entireties.

BACKGROUND

1. Field

Apparatuses and methods consistent with the exemplary embodiments of the inventive concept relate to recording defective pixel information and correcting defective pixels.

2. Description of the Related Art

A solid-state image pickup device such as a charge coupled device (CCD) or a complementary metal-oxide semiconductor (CMOS) device is generally used in an image capturing apparatus such as a digital camera or a video camera. Defective pixels that may be generated in the process of manufacturing a solid-state image pickup device may degrade the quality of an image captured by an image capturing apparatus employing such sensor as well as the yield in the manufacturing process. However, it is technically difficult to completely eliminate defective pixels, thereby increasing manufacturing costs of the image sensor. Thus, various interpolation techniques for improving an image quality by using pixel values of pixels around defective pixels have been suggested.

In the related art, defective pixels are detected from a solid-state image pickup device based on a standard charge accumulation time measured under predetermined conditions at the time of shipping the solid-state image pickup device and based on output values obtained by performing exposure on the solid-state image pickup device. Location information about the defective pixels and output pixel value information of the defective pixels are acquired and stored, and the output pixel values of the defective pixels are interpolated using the location information about the defective pixels, the output pixel values of the defective pixel and output pixel values of pixels adjacent to the defective pixels. That is, in the related art, the defective pixels are detected in advance at the time of shipping the solid-state image pickup device, and the location information about the defective pixels is stored in a memory to identify the locations of the defective pixels.

Recently, high-resolution surveillance cameras of eight million pixels or more have been used, and even cameras supporting 4K (ultra-high definition (UHD)) videos, which have four times the number of pixels of full high definition (HD) videos, are expected to be commercialized. However, as the number of pixels of an image sensor increases, the number of defective pixels also increases. Also, given the price competitiveness of cameras, it is difficult to employ expensive image sensors with few defective pixels in cameras.

According to a related art defective pixel correction technique, as the number of defective pixels increases, the capacity of a memory such as a static random access memory (SRAM) needs to be increased accordingly, and as a result, the manufacturing costs of an entire product increases. For example, if only 1% of the pixels of an image sensor supporting eight million pixels become defective, the number of location data of the defective pixels amounts to 80,000, and the bit size of each defective pixel location data increases accordingly. As a result, the amount of data that needs to be stored increases exponentially.

Referring to FIG. 1, assuming that in an image sensor supporting eight million pixels, a total of 24 bits including 12 bits for an x-coordinate value and 12 bits for a y-coordinate value are required to record location information about a single defective pixel, about 2 million bits of an SRAM are used to record such defective pixel location information.

Specifically, in a case where the gain of an image sensor needs to be increased to capture a dark scene or in an unfavorable image-capturing environment with, for example, a high temperature condition or a long shutter time, the number of defective pixels may considerably increase, and the amount of defective pixel location information may also increase accordingly.

SUMMARY

Exemplary embodiments of the inventive concept provide an apparatus and method for recording information about defective pixels and an apparatus for correcting pixel values of defective pixels included in a high-resolution image sensor of a camera device, which are for efficiently restoring the pixel values of the defective pixels.

The exemplary embodiments also provide an apparatus and method for reducing the amount of data stored in a memory of the apparatus for correcting the pixel value of the defective pixels by minimizing the size of information about the defective pixel.

The exemplary embodiments also provide an apparatus and method for losslessly compressing the information about the defective pixel adaptively according to the distribution of the defective pixels included in an image sensor.

However, the inventive concept is not restricted to those embodiments set forth herein. The above and other exemplary embodiments will become more apparent to one of ordinary skill in the art to which the inventive concept pertains by referencing the detailed description of the exemplary embodiments given below.

According to an exemplary embodiment, there is provided an apparatus for correcting defective pixel values which may include: an image sensor comprising a plurality of pixels configured to convert light provided from a subject into an electrical signal, and output image data corresponding to the electrical signal; a data memory configured to store location information, which is encoded, about one or more defective pixels among the pixels; a location information decoder configured to decode the encoded location information about the defective pixels stored in the data memory; and a pixel corrector configured to identify the defective pixels from the pixels using the decoded location information, and interpolate pixel values of the defective pixels using at least one pixel value of one or more neighboring pixels adjacent to each of the defective pixels, wherein the location information decoder is configured to select one of a first decoding method and a second decoding method based on a distance between the defective pixels, and decode the encoded location information about the defective pixels using the selected decoding method.

According to an exemplary embodiment, there is provided an apparatus for recording information about defective pixels which may include: a pixel inspector configured to identify one or more defective pixels from a plurality of pixels included in an image sensor, and provide location information about the defective pixels; a location information encoder configured to encode the location information provided by the pixel inspector; and a data memory configured to store the encoded location information, wherein the location information encoder is configured to select one of a first encoding method and a second encoding method based on a distance between the defective pixels and encodes the location information provided by the pixel inspector using the selected encoding method.

According to the aforementioned and other exemplary embodiments, pixel values of defective pixels included in a high-resolution image sensor can be efficiently restored without using a memory with large storage capacity.

In addition, the size of location information about the defective pixels for use in correcting the defective pixel values can be minimized.

Other features and exemplary embodiments may be apparent from the following detailed description, the drawings, and the claims.

BRIEF DESCRIPTION OF THE DRAWINGS

Various aspects of the inventive concept will become more apparent by describing in detail exemplary embodiments thereof with reference to the attached drawings, in which.

DETAILED DESCRIPTION OF THE EXEMPLARY EMBODIMENTS

Figure 1:
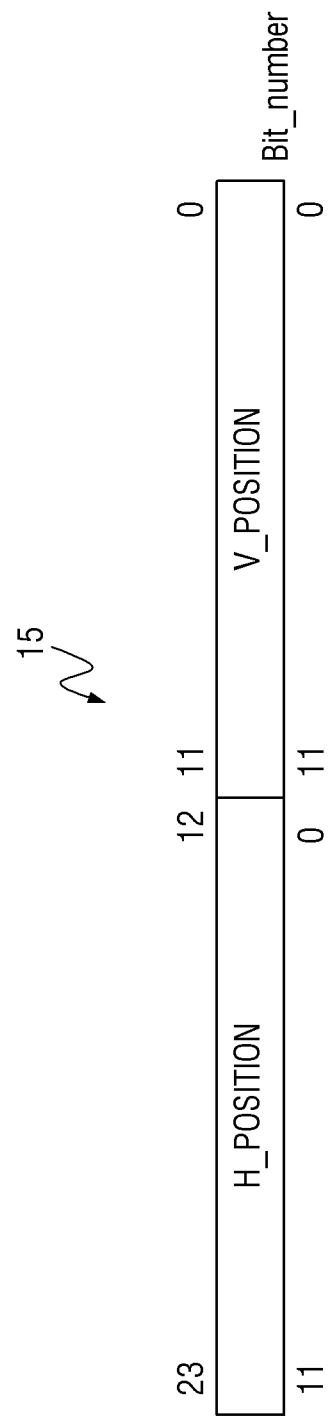
FIG. 1 is a schematic view showing a data format of defective pixel location information in a related art.

Advantages and features of the inventive concept and methods of accomplishing the same may be understood more readily by reference to the following detailed description of exemplary embodiments and the accompanying drawings. It is understood that all embodiments described herein are exemplary. The inventive concept may, however, be embodied in many different forms and should not be construed as being limited to the embodiments set forth herein. Rather, these embodiments are provided so that this disclosure will be thorough and complete and will fully convey the concept of the inventive concept to those skilled in the art, and the present disclosure will only be defined within the scope of the appended claims Like reference numerals indicate like elements throughout the present disclosure.

Figure 2:
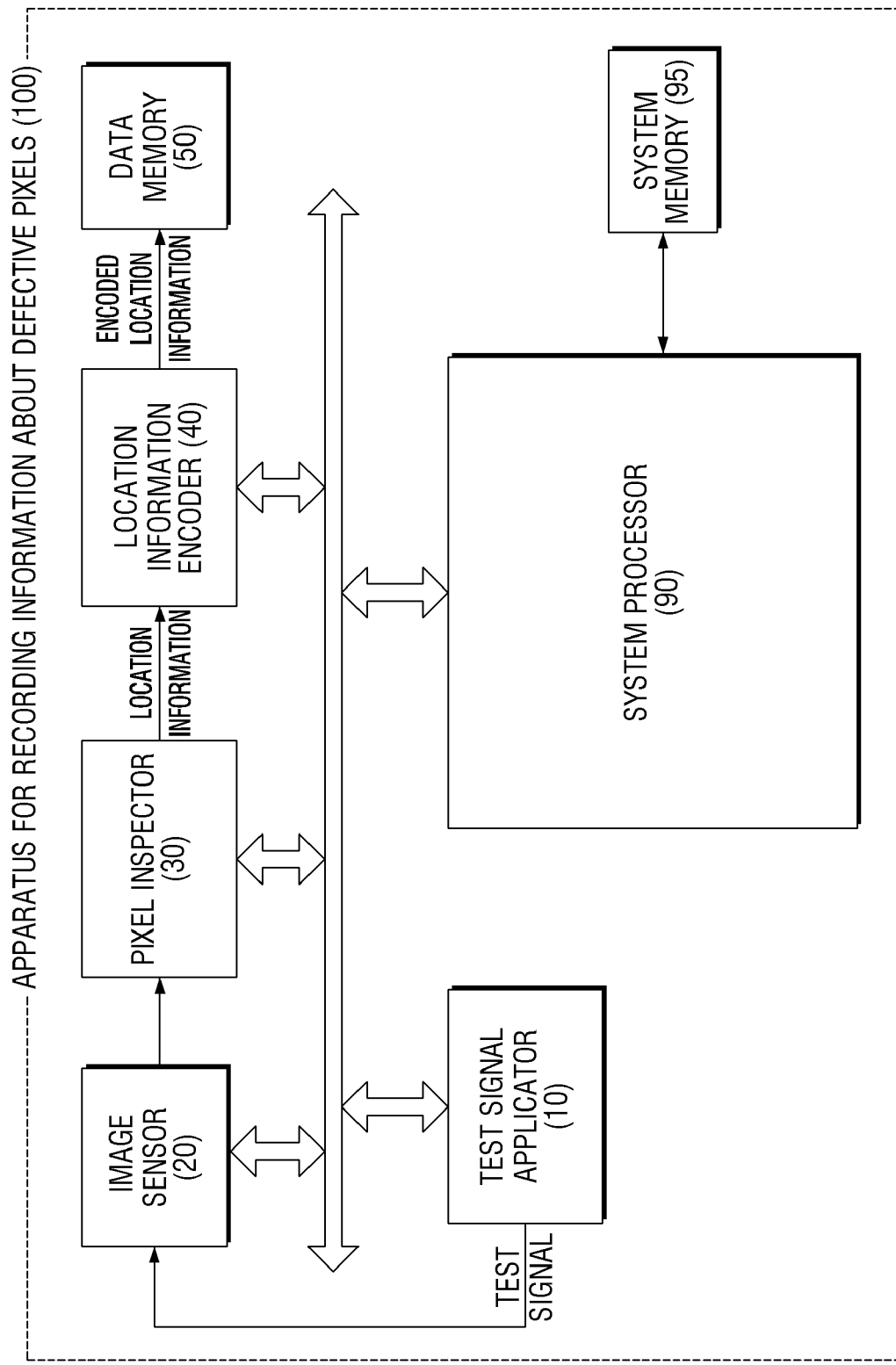
FIG. 2 is a block diagram of an apparatus for recording information about defective pixels, according to an exemplary embodiment.

FIG. 2 is a block diagram of an apparatus 100 for recording information about defective pixels, according to an embodiment. Referring to FIG. 2, the apparatus 100 may include a test signal applicator 10, an image sensor 20, a pixel inspector 30, a location information encoder 40, a data memory 50, a system processor 90, and a system memory 95.

The image sensor 20, which is a solid-state image pickup device converting light emitted from a subject into image data (or an electrical signal), may be implemented as a charge coupled device (CCD) or a complementary metal-oxide semiconductor (CMOS) device.

The test signal applicator 10 applies a test signal to the image sensor 20 to test the image sensor 20. The test signal may be a simple white image or a red (R)-green (G)-blue (B) image for testing for each color channel. The test signal may be applied to the image sensor 20 according to various temperature standards considering that defective pixels may be generated depending on temperature. Alternatively, light from an actual subject, rather than a physical signal, may be used as the test signal.

The pixel inspector 30 tests the image sensor 20 for a defective pixel by comparing a target pixel value that is supposed to be generated in response to the test signal applied by the test signal applicator 10 with a pixel value that is actually output by the image sensor 20 in response to the test signal. Defective pixels detected by the pixel inspector 30 may be dead pixels, that do not generate a pixel value in response to the test signal, or may simply be pixels that return pixel values that are different from the target pixel value by more than a predetermined reference level or value. Alternatively, pixels that do not satisfy a standard set according to the temperature of the image sensor 20 may also be determined as defective pixels.

The pixel inspector 30 detects defective pixels from the image sensor 20, and outputs location information about the defective pixels. The location information may be, for example, horizontal and vertical coordinates of each of the defective pixels.

The location information encoder 40 encodes (or losslessly compresses) the location information output by the pixel inspector 30, and records the encoded location information in the data memory 50. The location information encoder 40 will be described later in detail with reference to FIG. 3.

The data memory 50 may be implemented as various storage devices such as a random access memory (RAM), a flash memory, or a solid state disk (SSD) not being limited thereto. Particularly, the data memory 50 may be provided as a static RAM (SRAM).

The system processor 90 is a controller controlling the entire apparatus 100. The system processor 90 executes programs stored in the system memory 95. A region for storing system information and/or user setting information is provided in the system memory 46 so that various information and/or settings can be read and restored later as necessary. The system memory 95 may be implemented as a RAM, a flash memory, an SSD, or the like.

Figure 3:
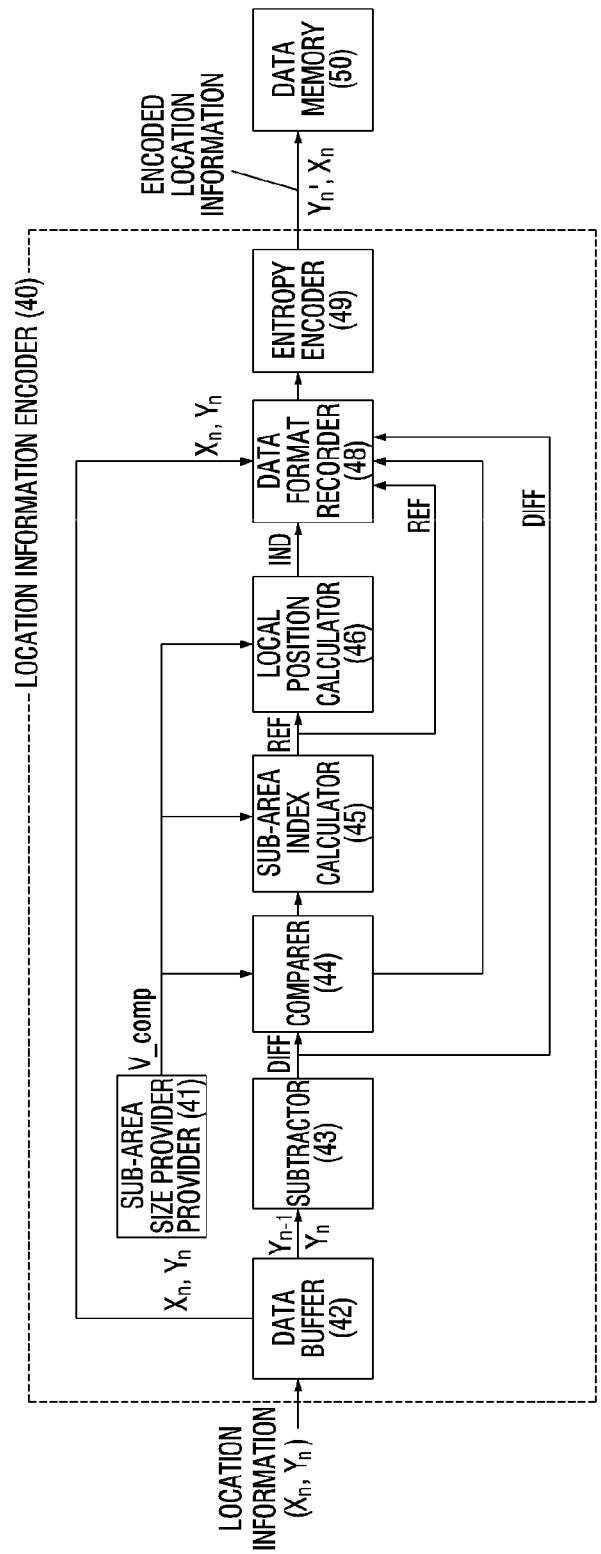
FIG. 3 is a block diagram of a location information encoder of the apparatus of FIG. 2, according to an exemplary embodiment.

FIG. 3 is a block diagram of the location information encoder 40. Referring to FIG. 3, the location information encoder 40 generates encoded location information by encoding the defective pixel location information provided by the pixel inspector 30, and stores the encoded location information in the data memory 50. Specifically, the location information encoder 40 may select one of a plurality of encoding methods based on the distance between the defective pixels, and may encode the defective pixel location information using the selected encoding method. Here, the distance between the defective pixels may be a distance between two adjacent defective pixels in a scan order (e.g., a distance, in a vertical direction, between defective pixels).

The defective pixel location information provided by the pixel inspector 30 is temporarily stored in a data buffer 42, and is then provided to a subtractor 43 and a data format recorder 48.

The subtractor 43 subtracts the vertical coordinate of a previous defective pixel that is followed by a current defective pixel in a scan order from the vertical coordinate of the current defective pixel, and the result of the subtraction to a comparer 44 as a difference value DIFF. The term "scan order," as used herein, refers to an order by which a plurality of pixels, that form a single image sensor panel or generate a frame of image data, are sequentially scanned.

Figure 4:
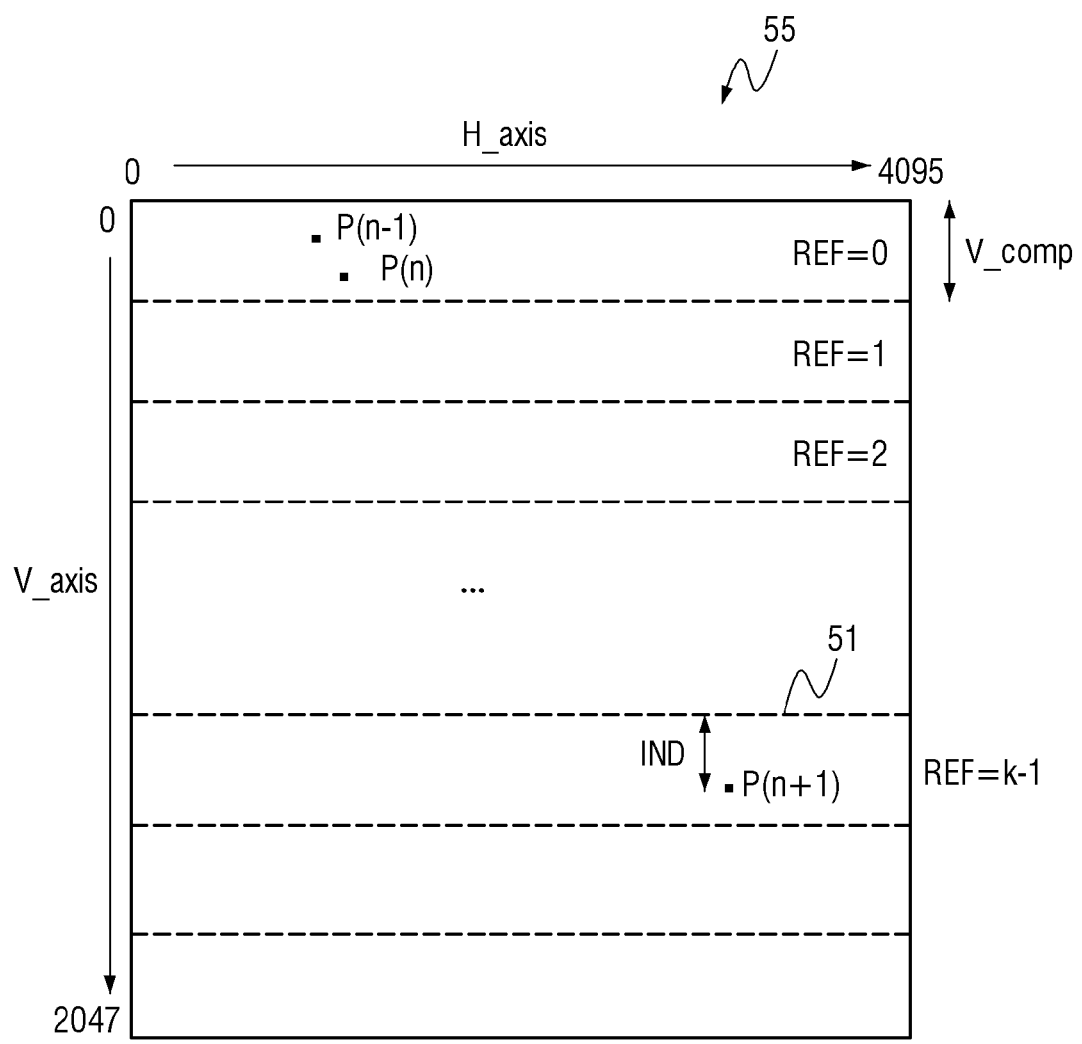
FIG. 4 is a schematic view showing an image sensor panel formed of a plurality of pixels corresponding to a frame of image data generated by a plurality of pixels of an image sensor.

A sub-area size provider 41 generates a sub-area size V_comp which is a unit for dividing an entire area 55 of an image sensor panel or image data, and provides the sub-area size V_comp to the comparer 44 and a sub-area index calculator 45. FIG. 4 illustrates an image sensor panel formed of a plurality of pixels corresponding to a frame of image data generated by the pixels. Referring to FIG. 4, the entire area 55 has a total of 4096×2048 pixels (i.e., 4096 pixels in a horizontal direction and 2048 pixels in a vertical direction). The entire area 55 may be divided into a plurality of sub-areas in the vertical direction, and the sub-area size V_comp refers to the size of each of the plurality of sub-areas. FIG. 4 shows three defective pixels, i.e., defective pixels P(n−1), P(n), and P(n+1). The defective pixels P(n−1) and P(n) belong to the same sub-area (REF=0), and the defective pixel P(n+1) belong to a different sub-area (REF=k−1) from the other two defective pixels P(n−1) and P(n). The relative position of the defective pixel P(n+1) in the sub-area where the defective pixel P(n+1) belongs is represented as "IND".

The sub-area size V_comp may be fixed or may be (proportionally) variable depending on the size, in the vertical direction, of the entire area 55, i.e., V_axis. Alternatively, the sub-area size V_comp may be generated by a user input. For example, when V_axis is 2048, as illustrated in FIG. 4, the sub-area size V_comp may be set to $2^n$ (where $2^n$=32, 64, . . . ).

Figure 5:
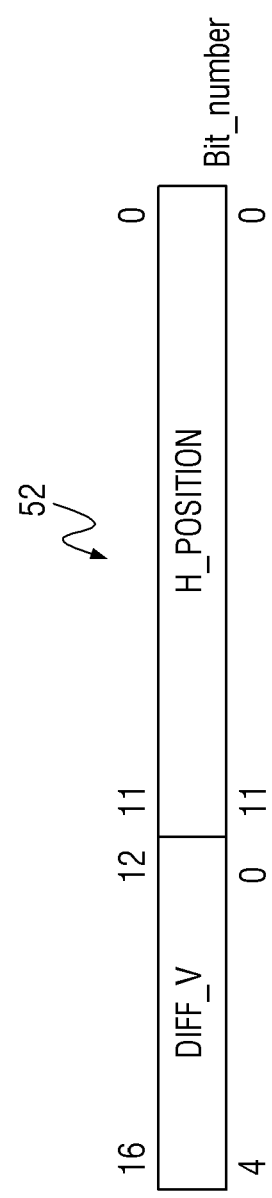
FIG. 5 is a schematic view showing location information encoded in accordance with a first encoding (or decoding) method.
Figure 6:
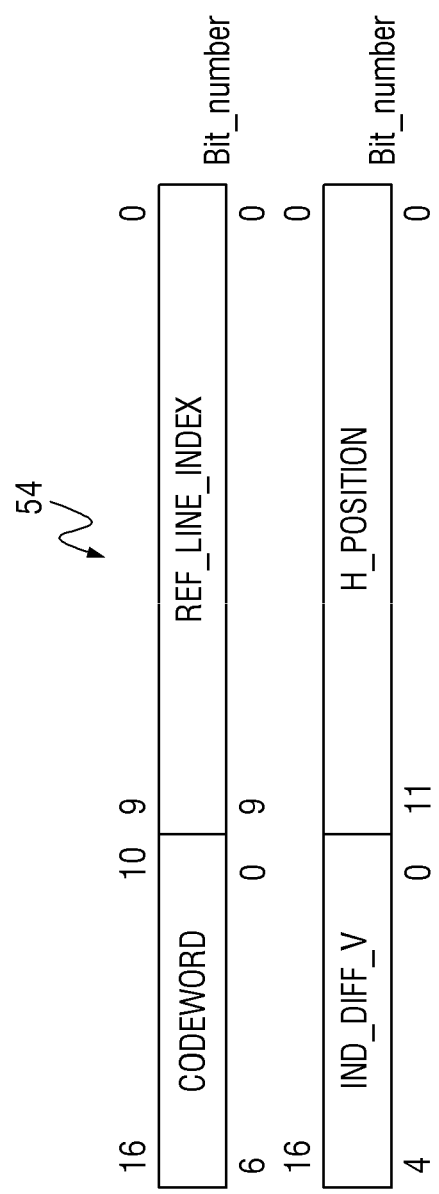
FIG. 6 is a schematic view showing location information encoded in accordance with a second encoding (or decoding) method.

The comparer 44 compares the sub-area size V_comp provided by the sub-area size provider 41 with the difference value DIFF provided by the subtractor 43. Then, if the difference value DIFF is smaller than or equal to the sub-area size V_comp, the comparer 48 controls the data format recorder 48 to generate a data format 52 as illustrated in FIG. 5. On the other hand, if the difference value DIFF is greater than the sub-area size V_comp, the comparer 48 controls the area index calculator 45 to generate a data format 54 as illustrated in FIG. 6.

According to a result of the foregoing comparison of the sub-area size V_comp with the difference value DIFF by the comparer 44, the data format recorder 48 generates the data format 52 as illustrated in FIG. 5 (in accordance with a first encoding method). The data format 52 includes a "DIFF_V" field, which records the difference value DIFF obtained from the vertical coordinates of the previous and current defective pixels, and a "H_POSITION" field, which records non-compressed horizontal coordinate information about the current defective pixel. The difference value DIFF may be recorded in the "DIFF_V" field as, for example, 5-bit information. In this case, the difference value DIFF may have a maximum of $2^5$, i.e., 32. Since the maximum of the difference value DIFF is the same as the sub-area size V_comp, the sub-area size V_comp may be limited up to a value of 32. However, the size of the "DIFF_V" field and the sub-area size V_comp are not particularly limited.

The bit quantity of the difference value DIFF is limited by the sub-area size V_comp, regardless of the size of the entire area in the vertical direction, i.e., V_axis. For example, when the sub-area size V_comp is 32, as illustrated in FIG. 5, the difference value DIFF may be a value not exceeding 32. Thus, the number of bits allocated to the difference value DIFF can also be reduced to five, as illustrated in FIG. 5.

According to another result of the foregoing comparison of the sub-area size V_comp with the difference value DIFF by the comparer 44, the sub-area index calculator 45 calculates an index REF of a vertical sub-area where a vertical coordinate $Y_n$ of the current defective pixel belongs. For example, as illustrated in FIG. 4, the index REF of the vertical sub-area where the defective pixels P(n−1) and P(n) both belong is 0, and the index REF of the vertical sub-area where the defective pixel P(n+1) belongs is k−1. The index REF of the vertical sub-area where the current defective pixel belongs may be calculated by dividing the vertical coordinate $Y_n$ of the defective pixel P(n) by the sub-area size V_comp and rounding down the result of the division.

A local position calculator 46 calculates a local position IND of the vertical coordinate $Y_n$ of the defective pixel P(n) in the sub-area where the defective pixel P(n) belongs based on the sub-area size V_comp provided by the sub-area size provider 41 and the index REF provided by the sub-area index calculator 45. Referring to FIG. 4, if the current defective pixel is the defective pixel P(n+1), a local position IND of the defective pixel P(n+1) is determined by the vertical distance (in the number of pixels) from an upper boundary 51 of the sub-area (REF=k−1) where the defective pixel P(n+1) belongs to. The local position IND of the defective pixel P(n+1) may be calculated by subtracting the value obtained by multiplying the index REF of the defective pixel P(n+1) by the sub-area size V_comp from a vertical coordinate $Y_{n+1}$ of the defective pixel P(n+1).

The data format recorder 48 generates a data format 54 as illustrated in FIG. 6, using the index REF provided by the sub-area index calculator 45 and the local position IND provided by the local position calculator 46. The data format 54 includes a first field (i.e., a "CODEWORD" field) in which a codeword is recorded, a second field (i.e., an "REF_LINE_INDEX" field) in which the index REF of the vertical sub-area, where the current defective pixel belongs, is recorded, a third field (i.e., an "IND_DIFF_V" field) in which the local position IND of the vertical coordinate of the current defective pixel is recorded, and a fourth field (i.e., an "H_POSITION" field) in which non-compressed horizontal coordinate information about the current defective pixel is recorded, in that order. In the data format 54 of FIG. 6, the first and third fields may both have seven bits, and the second and fourth fields may both have ten bits.

The codeword recorded in the first field is an identifier bit of a predetermined bit size for distinguishing the data format 54, which is generated when the difference value DIFF is greater than the sub-area size V_comp, and is encoded in accordance with a second encoding method, from the data format 52, which is generated when the difference value DIFF is smaller than or equal to the sub-area size V_comp, and is encoded in accordance with the first encoding method. The codeword may preferably, but not necessarily, include bits that do not coincide with those of the "DIFF_V" field. Examples of the codeword including bits that do not coincide with those of the "DIFF_V" field will be described later with reference to FIG. 13. Alternatively, a 1-bit identifier field may be added to the front of each of the data formats 52 and 54 of FIGS. 5 and 6, instead of using the codeword, so that the data formats 52 and 54 are properly distinguishable at a decoder's end.

The data format recorder 48 may generate either the data format 52 of FIG. 5, which is encoded in accordance with the first encoding method, or the data format 54 of FIG. 6, which is encoded in accordance with the second encoding method, through the comparison of the difference value DIFF and the sub-area size V_comp. In this process, vertical coordinate information about defective pixels is compressed, but horizontal coordinate information about the defective pixels is not compressed. The reason is as follows. In horizontal raster scanning, which is a commonly-used scanning method, there are gradual increases in vertical coordinate information between defective pixels, and thus, the correlations in vertical coordinate information between defective pixels are high. On the other hand, there are frequent repeated increases and decreases in horizontal coordinate information between defective pixels, and thus, the correlations in horizontal coordinate information between defective pixels are low. Accordingly, the application of a compression algorithm to horizontal coordinate information about defective pixels may undesirably cause the amount of data of defective pixel location information to increase.

Figure 7:
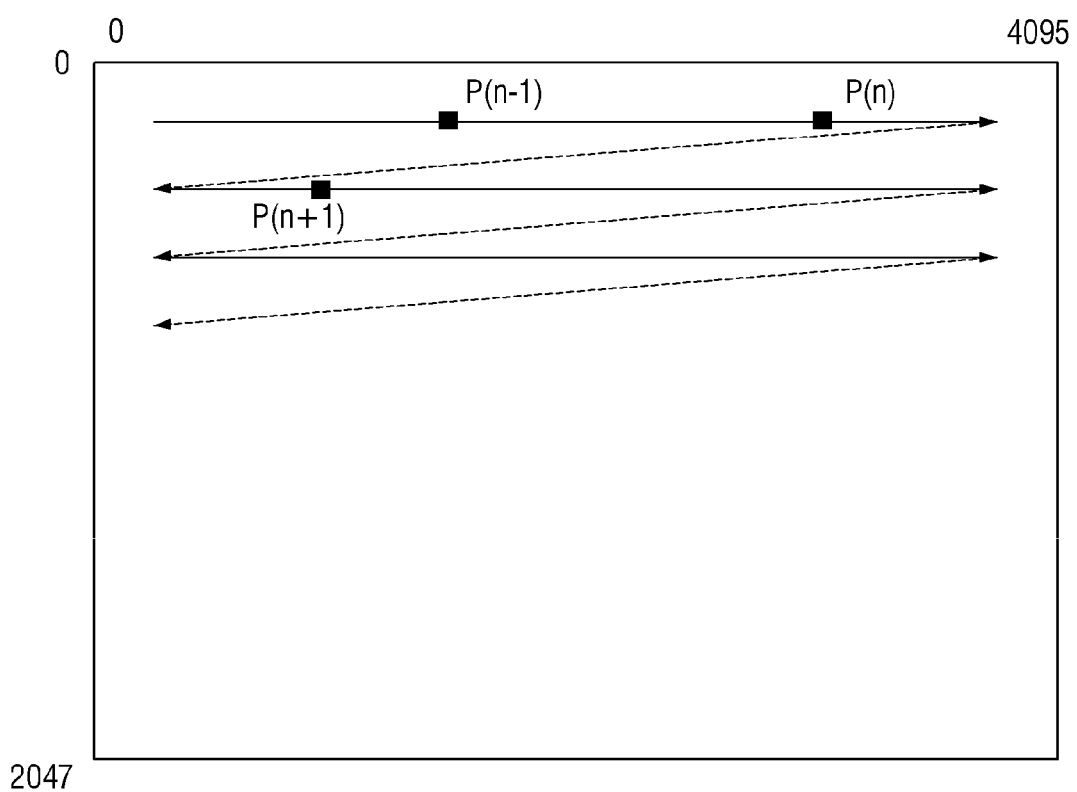
FIG. 7 is a schematic view showing the correlations between defective pixels when using horizontal raster scanning according to an exemplary embodiment.

FIG. 7 is a schematic view showing the correlations between defective pixels when using horizontal raster scanning according to an embodiment. Referring to FIG. 7, when there are three defective pixels, i.e., P(n−1), P(n), and P(n+1), the horizontal coordinates of the defective pixels P(n−1), P(n), and P(n+1) vastly differ from one another even though the defective pixels P(n−1), P(n), and P(n+1) are located adjacent to one another. This phenomenon becomes apparent when considering typical aspect ratios at which images are longer in a horizontal direction than in a vertical direction. On the other hand, the vertical coordinates of the defective pixels P(n−1), P(n), and P(n+1) do not differ much from one another only by zero or one.

Figures 8, 9:
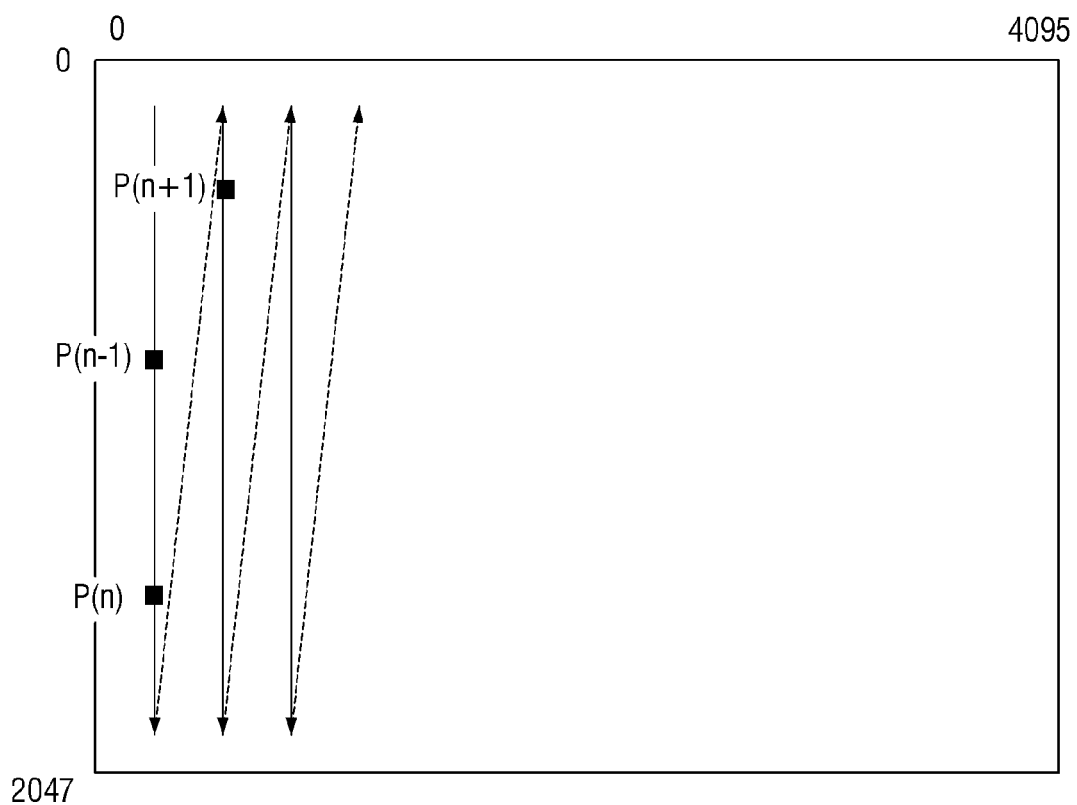
FIG. 8 is a schematic view showing correlations between defective pixels when using vertical raster scanning according to an exemplary embodiment.
FIG. 9 is a schematic view showing location information about multiple defective pixels, stored in a data memory.

On the contrary, referring to FIG. 8, in the case of using vertical raster scanning, the vertical coordinates of the defective pixels P(n−1), P(n), and P(n+1) vastly differ from one another, but the horizontal coordinates of the defective pixels P(n−1), P(n), and P(n+1) do not differ much from one another. Thus, vertical coordinate information about the defective pixels P(n−1), P(n), and P(n+1) may not be compressed, and only horizontal coordinate information about the defective pixels P(n−1), P(n), and P(n+1) may preferably, but not necessarily, be compressed. In the description that follows, it is assumed that typical horizontal raster scanning is used, as illustrated in FIG. 7.

Referring again to FIG. 3, the data format provided by the data format recorder 48 may be further compressed losslessly by an entropy encoder 49. Various encoding algorithms such as Huffman encoding, variable length encoding, binary arithmetic encoding, or the like may be used by the entropy encoder 49. An encoded bitstream produced by the entropy encoder 49 is stored in the data memory 50. As illustrated in FIG. 9, the encoded bitstream includes a plurality of units, regardless of the fact that the data format provided by the data format recorder 48 is the data format 52 or the data format 54, and each of the plurality of units sequentially includes vertical location information $EY_n$ and horizontal location information $EX_n$ of a defective pixel $P_n$. The horizontal location information $EX_n$ has the same format regardless of the type of encoding method used, but the vertical location information $EY_n$ has completely different formats depending on its respective difference value DIFF, as described above with reference to FIGS. 5 and 6. Thus, the vertical horizontal information $EY_n$ comes ahead of the horizontal location information $EX_n$ in each of the plurality of units of the encoded bitstream to indicate the type of encoding method used.

Encoding location information provided by the location information encoder 40 and stored in the data memory 50 is transmitted to an apparatus 200 for correcting defective pixels.

Figure 10:
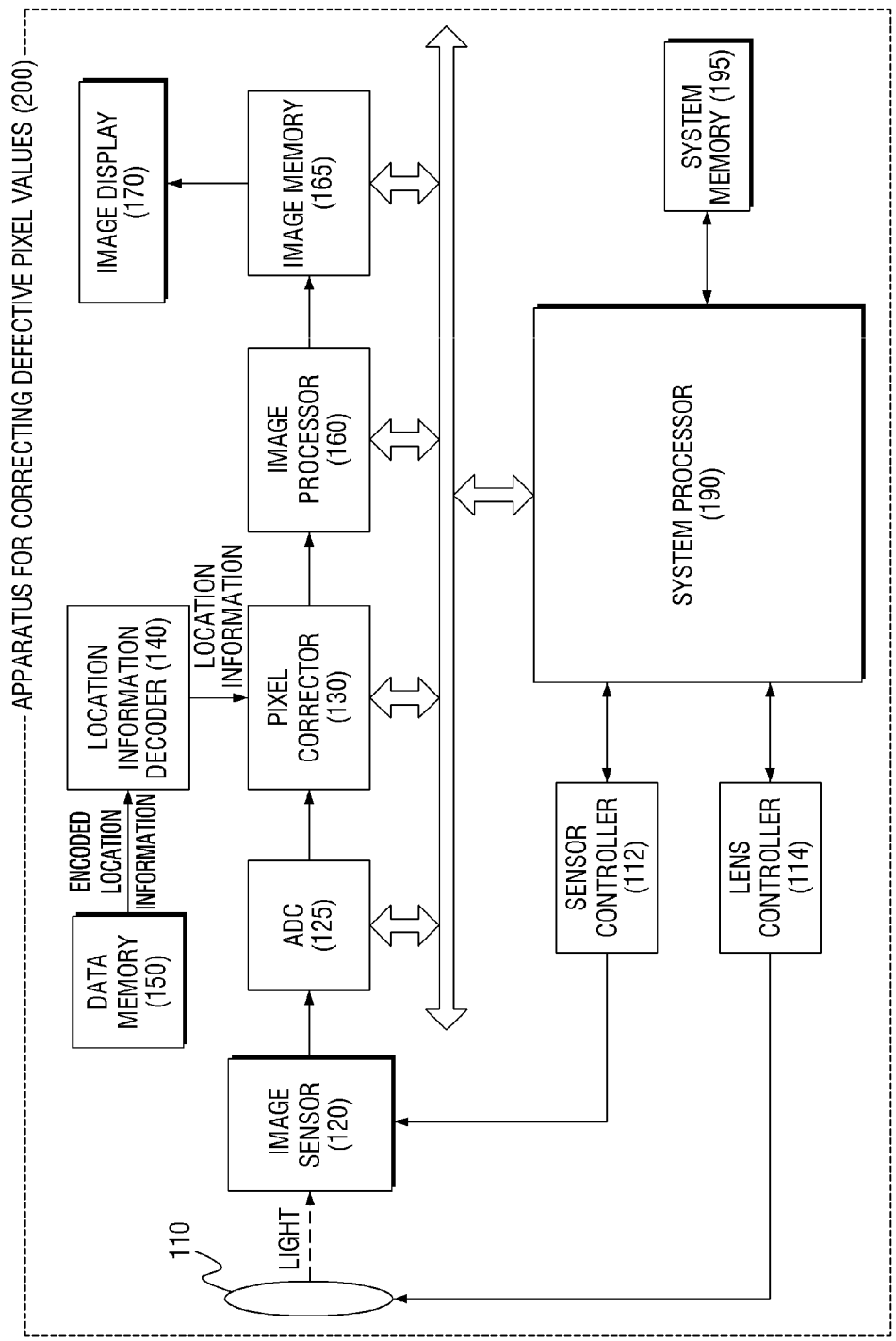
FIG. 10 is a block diagram of an apparatus for correcting defective pixel values, according to an exemplary embodiment.

FIG. 10 is a block diagram of an apparatus 200 for correcting defective pixel values according to an embodiment. Referring to FIG. 10, the apparatus 200 may include a photographing lens 110, an image sensor 120, an analog-to-digital converter (ADC) 125, a pixel corrector 130, a location information decoder 140, a data memory 150, and an image processor 160, and may further include a system processor 190, a system memory 195, a sensor controller 112, a lens controller 114, an image memory 165, and an image display 170.

Light reflected from a subject is received by the image sensor 120 via the photographing lens 110. The image sensor 120 is a solid-state image pickup device converting the reflected light into image data (or an electrical signal), and may be implemented as a CCD or a CMOS device. The image sensor 120 may be a color sensor in which color filters of three colors, i.e., red (R), green (G), and blue (B) colors are arranged in a Bayer pattern. According to an embodiment, pixel data may be output in such a manner that a pixel array output in the order of R→G→R→G→ . . . , and a pixel array output in the order of B→G→B→G→ . . . can be repeatedly alternated with each other. However, the inventive concept is not limited to this embodiment, and the order of colors output this output order is an example, and the order in which to output color colors may vary depending on the arrangement of the color filters in the image sensor 120.

An RGB analog signal output by the image sensor 120 is converted into a digital signal by the ADC 120 through a variety of analog processing, and the digital signal is output to the pixel corrector 130 as digital pixel data.

A data format stored in the data memory 150 regarding defective pixels is provided to the location information decoder 140, and the location information decoder 140 restores defective pixel location information by decoding the data format provided by the location information encoder 40 of the apparatus 100. The data format stored in the data memory 150 is encoded location information stored in the data memory 50 of the apparatus 100.

The location information decoder 140 will be described later in detail with reference to FIG. 12.

The pixel corrector 130 identifies a defective pixel generating a defective pixel value provided by the ADC 125 using the defective pixel location information provided by the location information decoder 140. Specifically, the pixel corrector 130 detects a defective pixel from among the pixels of the image sensor using the defective pixel location information, and interpolates a pixel value of the detected defective pixel using a pixel value of at least one pixel around the detected defective pixel.

Figure 11:
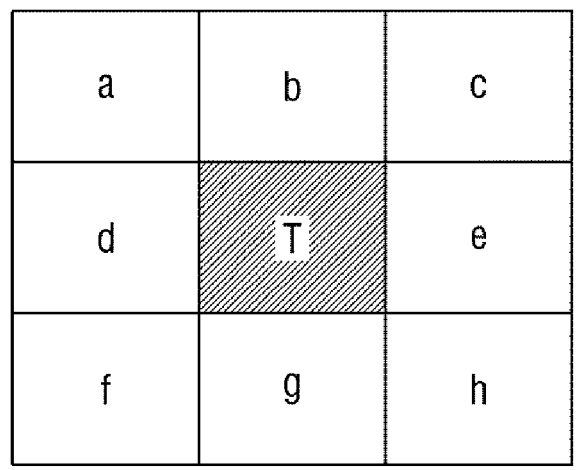
FIG. 11 is a schematic view showing an example of how to interpolate a pixel value of a defective pixel using one or more pixel values of valid pixels around a defective pixel, according to an exemplary embodiment.

FIG. 11 is a schematic view showing an example of how to interpolate a pixel value of a defective pixel T using one or more pixel values of valid pixels around the defective pixel T, according to an embodiment. Referring to FIG. 11, the pixel value of the defective pixel T can be interpolated using pixel values of pixels a through h around the defective pixel T. For example, the pixel value of the defective pixel T may be interpolated using a mean or median of pixel values of the pixels a through h. Alternatively, the pixel value of the defective pixel T may be interpolated using a weighted mean of pixel values of the pixels a through h, calculated based on the correlations between the defective pixel T and the pixels a through h.

Any defective pixels among the pixels a through h are not used to interpolate the defective pixel T. The exemplary embodiment of FIG. 11 is merely exemplary, and the number of pixels used to interpolate the defective pixel T is not particularly limited.

The image processor 160 performs a variety of digital processing, such as automatic white balance (AWB), contrast adjustment, gamma adjustment, and the like, on pixel data input thereto. Then, the image processor 160 allows the system processor 190 to control the sensor controller 112 and the lens controller 114 based on the result of the digital processing.

The sensor controller 112 controls a mechanical or electronic shutter provided in the image sensor 120 to adjust the degree of exposure. Also, the sensor controller 112 controls a flash dimming function by interworking with a flash (not illustrated). Also, the lens controller 114 controls the focus or zoom magnification of the photographing lens 110.

A still or moving image generated by the image processor 160 is stored in the image memory 165. The image display 170 is implemented as a liquid crystal display (LCD), an organic light-emitting diode (OLED) display, or a cathode ray tube (CRT) and displays the image stored in the image memory 165.

The system processor 190 is a controller controlling the entire apparatus 200. The system processor 190 executes programs stored in the system memory 195. A region for storing system information and/or user settings information is provided in the system memory 195 so that various information or settings can be read and restored later as necessary. The system memory 195 may be implemented as a RAM, a flash memory, an SSD, or the like.

Figure 12:
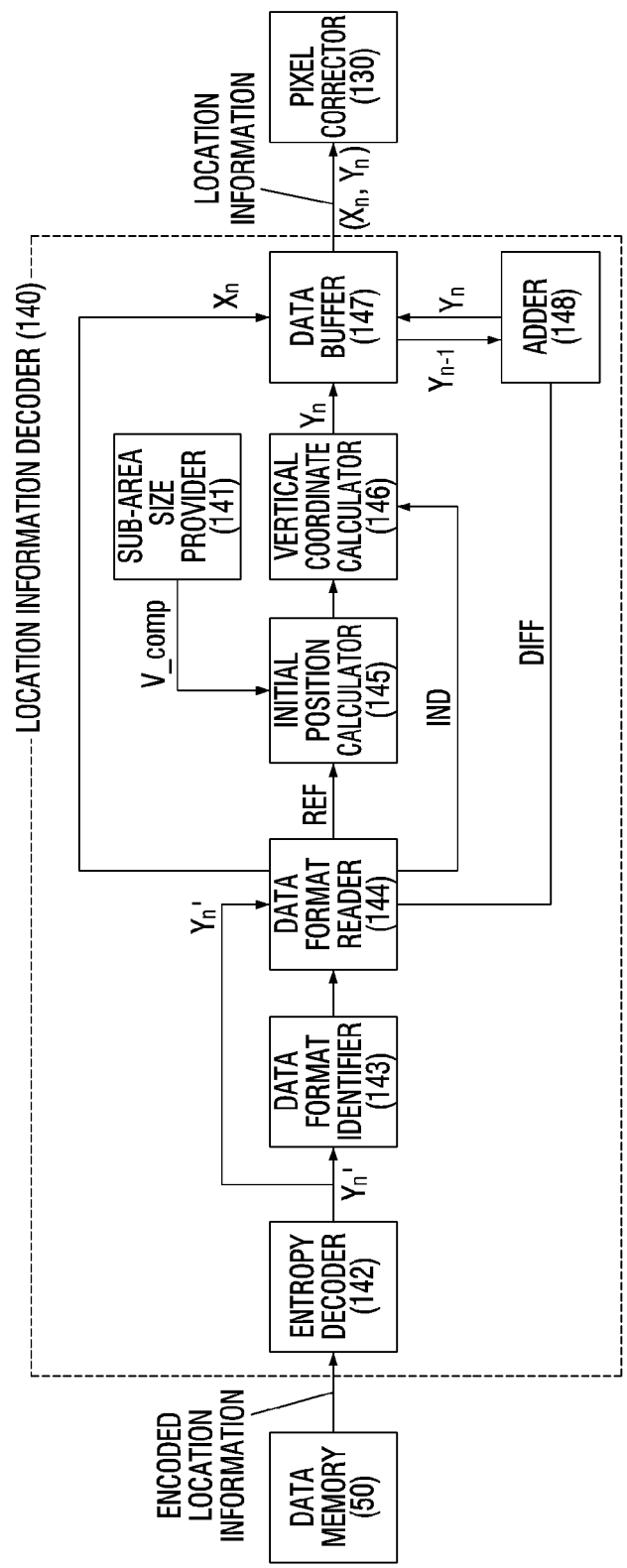
FIG. 12 is a block diagram of a location information decoder of the apparatus of FIG. 10, according to an exemplary embodiment.

FIG. 12 is a block diagram of the location information decoder 140, according to an embodiment. Referring to FIG. 12, the location information decoder 140 restores defective pixel location information from the encoded location information stored in the data memory 150 of FIG. 10. Specifically, the location information decoder 140 selects one of first and second decoding methods based on the distance between defective pixels and restores the defective pixel location information using the selected decoding method. Here, the distance between the defective pixels refers to a distance between defective pixels adjacent to each other in a scan order (or a distance between the vertical coordinates of the defective pixels).

An entropy decoder 142 losslessly decodes the data format (i.e., the encoded location information) stored in the data memory 150. Here, a decoding algorithm corresponding to the encoding algorithm used in the entropy encoder 49 of the location information encoder 40 of FIG. 3, such as Huffman decoding, variable length decoding, or binary arithmetic decoding, may be used. If the entropy encoder 49 is not used in the location information encoder 40, the entropy decoder 142 may not be provided in the location information decoder 140.

A data format determiner 143 reads a number of bits (i.e., as many bits as the size of the "CODEWORD" field of FIG. 6) from the front of the data format to determine whether the data format is to be decoded by the first decoding method or the second decoding method. Since the front part of the data format 52 of FIG. 5 does not coincide with the front part the data format 54 of FIG. 6, a determination can be made as to whether the data format is encoded by the first encoding method or the second encoding method, at an encoder's end based on the bits read from the front of the data format.

The method in which the data format is decoded by the location information decoder 140 corresponds to the method in which the data format is encoded by the location information encoder 40. Since the method in which the data format is encoded by the location information encoder 40 is determined based on the distance between a current defective pixel and a defective pixel previous to the current defective pixel in a scan order, the method in which the data format is decoded by the location information decoder 140 may be understood as being determined based on the distance between the previous and current defective pixels.

The data format reader 144 reads each of the fields of the data format according to a definition of the data format, as determined by the data format determiner 143. If the data format is determined to be decoded by the first decoding method, the data format reader 144 reads a field (i.e., a "DIFF_V" field) in which a difference value DIFF between a vertical coordinate $Y_n$ of the current defective pixel and a vertical coordinate $Y_{n-1}$ of the previous defective previous is recorded and a field (i.e., an "H_POSITION" field) in which non-compressed horizontal coordinate $X_n$ of the current defective pixel is recorded from the data format (see FIG. 5). The difference value DIFF read by the data format reader 144 is provided to an adder 148, and the horizontal coordinate $X_n$ is provided to a data buffer 147.

The adder 148 restores the vertical coordinate $Y_n$ of the current defective pixel by adding up the difference value DIFF and the vertical coordinate $Y_{n-1}$ of the previous defective pixel, temporarily stored in the data buffer 147. The restored vertical coordinate $Y_n$ is temporarily stored again in the data buffer 147. In this manner, the restored horizontal and vertical coordinates $X_n$ and $Y_n$ are both stored in the data buffer 147, and are provided later to the pixel corrector 130 as location information.

On the other hand, if the data format is determined to be decoded by the second decoding method, the data format reader 144 reads a field (i.e., an "REF_LINE_INDEX" field) in which an index REX of a vertical sub-area where the vertical coordinate $Y_n$ of the current defective pixel belongs is recorded, a field (i.e., an "IND_DIFF_V" field) in which a local position IND of the vertical coordinate $Y_n$ of the current defective pixel in the sub-area where the vertical coordinate of the current defective pixel belongs is recorded, and a field (i.e., an "H_POSITION" field) in which the non-compressed horizontal coordinate $X_n$ of the current defective pixel is recorded from the data format (see FIG. 6).

The index REF read by the data format reader 144 is provided to an initial position calculator 145, the local position IND of the vertical coordinate of the current defective pixel in the sub-area, where the current defective pixel belongs, is provided to a vertical coordinate calculator 146, and the horizontal coordinate $X_n$ is provided to the data buffer 147.

The initial position calculator 145 calculates the initial position (51 of FIG. 4) of the sub-area where the current defective pixel (e.g., the defective pixel P(n)) belongs (REF=0). Specifically, the initial position of the sub-area where the current defective pixel belongs may be calculated by multiplying the index REF of the vertical sub-area, where the current defective pixel belongs, by vertical sub-area size V_comp. The vertical sub-area size V_comp may be provided by a sub-area size provider 141. The vertical sub-area size V_comp may be agreed upon in advance between the apparatus 100 and the apparatus 200, may be defined according to a predetermined set of rules, or may be provided by the apparatus 100.

The vertical coordinate calculator 146 restores the vertical coordinate $Y_n$ of the current defective pixel by adding up the initial position calculated by the initial position calculator 145 and the local position IND of the vertical coordinate $Y_n$ of the current defective pixel, and temporarily stores the restored vertical coordinate $Y_n$ in the data buffer 147. In this manner, the restored horizontal and vertical coordinates $X_n$ and $Y_n$ are both stored in the data buffer 147, and are provided later to the pixel corrector 130 as location information.

Thus far, embodiments of the inventive concept in which different encoding (or decoding) methods are used depending on the distance between adjacent defective pixels in a scan order have been described. The data format 54 of FIG. 6, unlike the data format 52 of FIG. 5, requires a larger number of bits than a related art data format in which horizontal coordinate information and vertical coordinate information are simply juxtaposed with each other, and thus may incur overhead of a large bit quantity in theory. However, when the data format 54 is selected, it means that there are not many defective pixels, in which case, such overhead may not be considerably problematic to the storage capacity of a data memory such as an SRAM. On the other hand, when there exists an issue with the storage capacity of the data memory, i.e., when the number of defective pixels rapidly increases, the data format 52 may be selected over the data format 54, in which case, the amount of data that needs to be stored can be considerably reduced.

Each of the elements illustrated in, or described above with reference to, FIGS. 1, 3, 10, and 12 may be implemented as a software component, such as a task, a class, a sub-routine, a process, an object, an execution thread, or a program, as a hardware component, such as a field-programmable gate array (FPGA) or an application-specific integrated circuit (ASIC), or as the combination of the software component and the hardware component. These elements may be included in a computer-readable storage medium, or may be distributed over a plurality of computers.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed at the same time or executed in reverse order.

Figure 13:
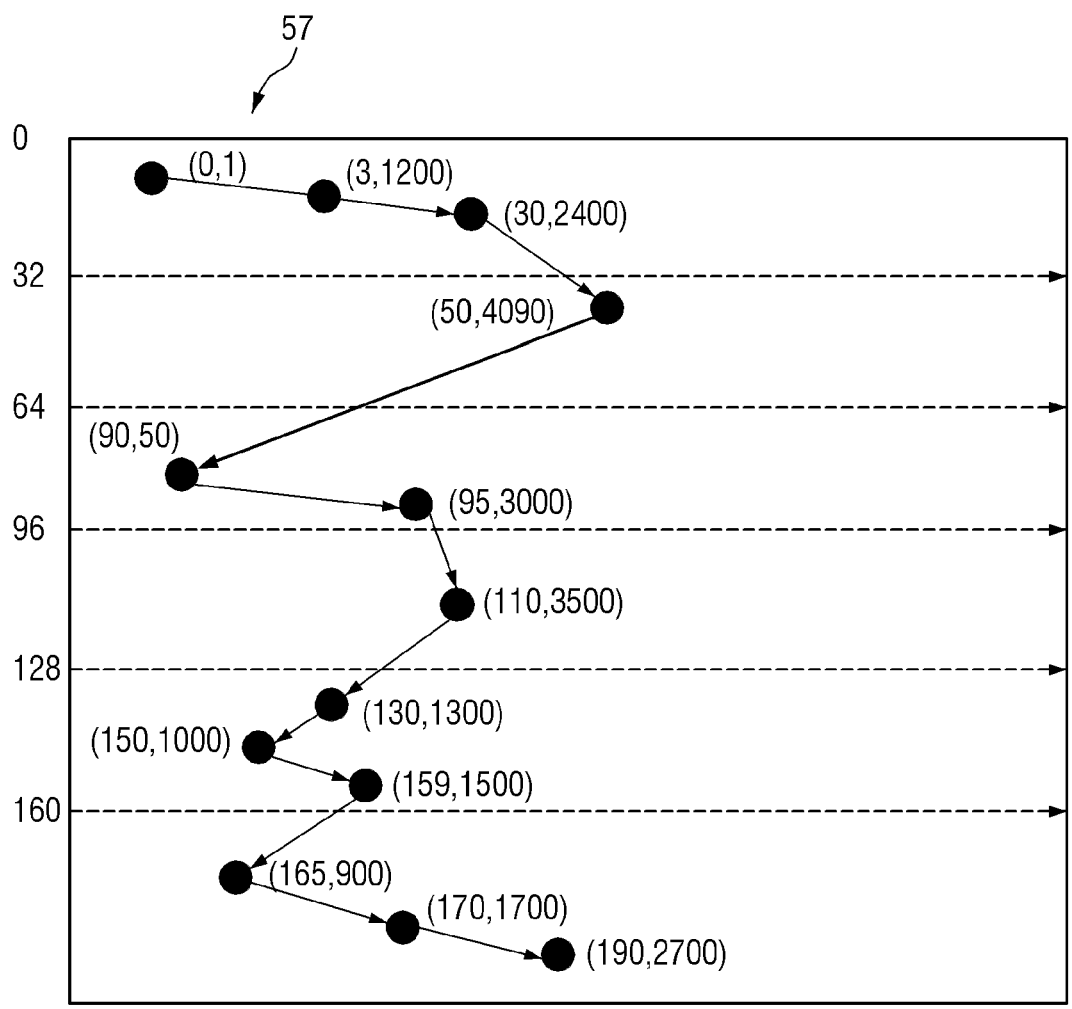
FIG. 13 is a schematic view illustrating an example of how to encode and decode location information, according to an exemplary embodiment.

FIG. 13 is a schematic view illustrating an example of how to encode and decode location information about defective pixels, according to an embodiment. Referring to FIG. 13, an image sensor panel 57 includes a total of 13 defective pixels, a sub-area size V_comp is set to 32, and each coordinate pair contains y- and x-coordinates of a defective pixel, in that order. Location information about the 13 defective pixels may be as shown in Table 1 below. Referring to Table 1 below, the coordinate pair of a fourth defective pixel is (50, 4090) in decimal. Since the y-coordinate of the fourth defective pixel, i.e., 50, is "032" in hexadecimal and the x-coordinate of the fourth defective pixel, i.e., 4090, is "ffa" in hexadecimal, location information about the fourth defective pixel may be represented as "0x032ffa".

TABLE 1

| No. | Coordinates (y, x) | Data Format (Hexadecimal) |
|---|---|---|
| 1 | (0, 1) | 0x000001 |
| 2 | (3, 1200) | 0x0034b0 |
| 3 | (30, 2400) | 0x01e960 |
| 4 | (50, 4090) | 0x032ffa |
| 5 | (90, 50) | 0x05a032 |
| 6 | (95, 3000) | 0x05fbb8 |
| 7 | (110, 3500) | 0x06edac |
| 8 | (130, 1300) | 0x082514 |
| 9 | (150, 1000) | 0x0963e8 |
| 10 | (159, 1500) | 0x09f5dc |
| 11 | (165, 900) | 0x0a5384 |
| 12 | (170, 1700) | 0x0aa6a4 |
| 13 | (190, 2700) | 0x0bea8c |

Meanwhile, the data format of location information according to an embodiment for the image sensor panel 57 of FIG. 13 is as shown in Table 2 below.

TABLE 2

| No. | Coordinates (y, x) | Data Format (Hexadecimal) |
|---|---|---|
| 1 | (0, 1) | 0x00001 |
| 2 | (3, 1200) | 0x034b0 |
| 3 | (30, 2400) | 0x1b960 |
| 4 | (50, 4090) | 0x14ffa |
| 5 | (90, 50) | 0x00C20-0x1A032 |
| 6 | (95, 3000) | 0x05bb8 |
| 7 | (110, 3500) | 0x0fdac |
| 8 | (130, 1300) | 0x14514 |
| 9 | (150, 1000) | 0x143e8 |
| 10 | (159, 1500) | 0x095dc |
| 11 | (165, 900) | 0x06384 |
| 12 | (170, 1700) | 0x056a4 |
| 13 | (190, 2700) | 0x14a8c |

Referring to Table 2, the coordinate pair of the fourth defective pixel is (50, 4090), and the coordinate pair of a third defective pixel, which is previous to the fourth defective pixel, is (30, 2400). Accordingly, a difference value DIFF between the vertical coordinates of the third and fourth defective pixels is 20. Since the sub-area size V_comp of FIG. 13 is 32, and the difference value DIFF between the vertical coordinates of the third and fourth defective pixels is smaller than the sub-area size V_comp, the data format as illustrated in FIG. 5 is used for the fourth defective pixel. Specifically, the difference value DIFF of 20 is recorded in a "DIFF_V" field as a hexadecimal value of "14" and the x-coordinate of the fourth defective pixel, i.e., 4090, is recorded in an "H_POSITION" field as a hexadecimal value of "ffa". Accordingly, the location information about the fourth defective pixel becomes "0x14ffa", which is the combination of the hexadecimal values of "14" and "ffa".

Referring again to Table 2, the coordinate pair of a fifth defective pixel is (90, 50), and the coordinate pair of the fourth defective pixel, which is previous to the fifth defective pixel, is (50, 4090), and a difference value DIFF between the vertical coordinates of the fourth and fifth defective pixels is 40. Since the difference value DIFF between the vertical coordinates of the fourth and fifth defective pixels is greater than the sub-area size V_comp, the data format as illustrated in FIG. 6 is used for the fifth defective pixel. "0x00C20-0x1A032" may be recorded in a data field. Here, "0x00C20" indicates both a codeword (recorded in a "CODEWORD" field) and an index REF (recorded in an "REF_LINE_INDEX" field), and in the rest of "0x00C20-0x1A032", "1A" indicates that an initial position IND (recorded in an "IND_DIFF_V" field) is 26, and "032" denotes an x-coordinate value of 50 (recorded in an "H_POSITION" field). As already mentioned above, the index REF refers to an index REF of a sub-area where the y-coordinate of a current defective pixel belongs, and the initial position IND refers to a local position of the y-coordinate of the current defective pixel in the sub-area where the current defective pixel belongs.

"0x00C20" can be represented as a (binary) bit string "0_0000_1100_0010_0000". Here, the total number of bits is not 20 but 17, and the zero at the forefront of the hexadecimal value is a bit that can only represent zero or one. All the data formats shown in Table 2 above have a bit size of 17, and the zero at the forefront of each of the data formats (i.e., the zero that follows "0x") is a (1-bit) binary number. In the above bit string, "0000100000" is a codeword, a 7-bit fixed value, and "0000100000" is a 10-bit index REF.

Here, when a maximum x-coordinate value, i.e., the horizontal size of the image sensor panel 57 is 2952, as supported by existing high-resolution image sensors, the data format 52 of FIG. 5 and the data format 54 of FIG. 6 can be easily distinguished from each other, even without the need of signaling a flag, because a difference value DIFF and a codeword do not coincide with each other. The data format identifier 143 of FIG. 12 does not require any particular information to distinguish the two data formats, and sequentially reads the bit string input thereto.

First, the data format identifier 143 determines whether sixth and seventh bits of the input bit string are "11". If the sixth and seventh bits of the input bit string are "11", the data format identifier 143 can identify the input bit string as being a data format 54 as illustrated in FIG. 6. Specifically, if the input bit string is a data format 52 as illustrated in FIG. 5, the sixth through last bits of the input bit string correspond to an x-coordinate, and the sixth and seventh bits of the input bit string can never be "11" because the maximum x-coordinate value is 2592. That is, if the first two digits of a 12-digit bit string are "11", the 12-digit bit string is a minimum of 3072, and can never be an x-coordinate value, in which case, the data format identifier 143 can easily identify the input bit string as being a data format 54 as illustrated in FIG. 6. Obviously, if at least one of the sixth and seventh bits of the input bit string is zero, the data format identifier 143 may identify the input bit string as being a data format 52 as illustrated in FIG. 5.

Meanwhile, the fifth defective pixel has an index REF of "0000100000", which corresponds to a value of 32 and represents a full coordinate of the initial position of the sub-area where the fifth defective pixel belongs, rather than the index REF of the sub-area where the fifth defective pixel belongs. Referring to FIG. 13, the full coordinate of the sub-area where the fifth defective pixel belongs is 64, but the coordinate of the sub-area where the fifth defective pixel belongs is recorded as 32, which is obtained by dividing 64 by 2 because the coordinate of each sub-area is always an even number. However, the initial position calculator 145 may calculate the initial position of the sub-area where the fifth defective pixel belongs as 64 by multiplying 32 by 2. In this modified y embodiment, the initial position calculator 145 can calculate the initial position of the sub-area where the current defective pixel belongs simply based on the index REF provided by the data format reader 144 without the need to identify the sub-area size V_comp.

This modified embodiment is useful because the location information encoder 40 of FIG. 3 can temporarily store data formats for various sub-area sizes V_comp (e.g., 8, 16, 32, . . . ), and can encode defective pixel location information using one of the data formats that can produce a smallest data size. In this case, there is no need to signal the sub-area size V_comp because the sub-area size V_comp is set to vary and an appropriate data format corresponding to the sub-area size V_comp is simply transmitted to the location information decoder 140.

While exemplary embodiments are described above, it is not intended that these embodiments describe all possible forms of the inventive concept. Rather, the words used in the specification are words of description rather than limitation, and it is understood that various changes may be made without departing from the spirit and scope of the inventive concept. Additionally, the features of various implementing embodiments may be combined to form further exemplary embodiments of the inventive concept.

What is claimed is:

1. An apparatus for correcting defective pixel values, comprising:
    an image sensor comprising a plurality of pixels configured to convert light provided from a subject into an electrical signal, and output image data corresponding to the electrical signal;
    a data memory configured to store location information, which is encoded, about one or more defective pixels among the pixels;
    a location information decoder configured to decode the encoded location information about the defective pixels stored in the data memory; and
    a pixel corrector configured to identify the defective pixels from the pixels using the decoded location information, and interpolate pixel values of the defective pixels using at least one pixel value of one or more neighboring pixels adjacent to each of the defective pixels,
    wherein the location information decoder is configured to select one of a first decoding method and a second decoding method based on a distance between the defective pixels, and decode the encoded location information about the defective pixels using the selected decoding method.

2. The apparatus of claim 1, wherein the distance between the defective pixels is a distance between defective pixels adjacent to each other in a scan order.

3. The apparatus of claim 2, wherein the scan order is a horizontal direction raster scan order.

4. The apparatus of claim 3, wherein the encoded location information comprises, as a unit, non-compressed horizontal coordinate information and compressed vertical coordinate information.

5. The apparatus of claim 4, wherein the encoded location information comprises an ordered pair of the compressed vertical coordinate information and the non-compressed horizontal coordinate information.

6. The apparatus of claim 4, wherein the location information decoder is configured to select one of the first and second decoding methods by reading a predetermined number of bits from a front of the encoded location information.

7. The apparatus of claim 6, wherein the location information decoder is configured to read, in accordance with the first decoding method, a field in which a difference between a vertical coordinate of a current defective pixel and a vertical coordinate of a defective pixel previous to the current defective pixel in the scan order is recorded, and a field in which the non-compressed horizontal coordinate information is recorded.

8. The apparatus of claim 7, wherein the location information decoder is configured to decode the vertical coordinate of the current defective pixel by adding up the vertical coordinate of the previous defective pixel and the difference.

9. The apparatus of claim 6, wherein the location information decoder is configured to read, in accordance with the second decoding method, a field in which an index of a vertical sub-area, where a vertical coordinate of a current defective pixel belongs, is recorded, a field in which a local position of the vertical coordinate of the current defective pixel in the vertical sub-area, where the current defective pixel belongs, is recorded, and a field in which the non-compressed horizontal coordinate information is recorded, and wherein the vertical sub-area is a unit for dividing an area, of a panel of the image sensor where the pixels are disposed, corresponding to a frame of the image data.

10. The apparatus of claim 9, wherein the location information decoder is configured to decode the vertical coordinate of the current defective pixel by multiplying an index of the vertical sub-area, where the current defective pixel belongs, by a size of the vertical sub-area and adding up a result of the multiplication and the local position of the vertical coordinate of the current defective pixel.

11. The apparatus of claim 1, wherein the pixel corrector interpolates each of the pixel values of the defective pixels by calculating a mean, a weighted mean, or a median of pixel values of the neighboring pixels.

12. An apparatus for recording information about defective pixels, comprising:
a pixel inspector configured to identify one or more defective pixels from a plurality of pixels included in an image sensor, and provide location information about the defective pixels;
a location information encoder configured to encode the location information provided by the pixel inspector; and
a data memory configured to store the encoded location information,
wherein the location information encoder is configured to select one of a first encoding method and a second encoding method based on a distance between the defective pixels and encodes the location information provided by the pixel inspector using the selected encoding method.

13. The apparatus of claim 12, wherein the distance between the defective pixels is a distance between defective pixels adjacent to each other in a scan order.

14. The apparatus of claim 13, wherein the scan order is a horizontal direction raster scan order.

15. The apparatus of claim 14, wherein the encoded location information comprises, as a unit, non-compressed horizontal coordinate information and compressed vertical coordinate information in this order.

16. The apparatus of claim 15, wherein the location information encoder is configured to select one of the first and second encoding methods by comparing a difference between a vertical coordinate of a current defective pixel and a defective pixel previous to the current defective pixel in the scan order and a size of a vertical sub-area, and
wherein the vertical sub-area is a unit for dividing an area, of a panel of the image sensor where the pixels are disposed, corresponding to a frame of image data output from the image sensor.

17. The apparatus of claim 16, wherein if the difference is smaller than the size of the vertical sub-area, the location information encoder generates a field in which the difference is recorded and a field in which the non-compressed horizontal coordinate information is recorded as the encoded location information in accordance with the first encoding method.

18. The apparatus of claim 16, wherein if the difference is greater than the size of the vertical sub-area, the location information encoder generates a field in which an index of a vertical sub-area, where the vertical coordinate of the current defective pixel belongs, is recorded, a field in which a local position of the vertical coordinate of the current defective pixel in the vertical sub-area, where the current defective pixel belongs, is recorded, and a field in which the non-compressed horizontal coordinate information is recorded as the encoded location information in accordance with the second encoding method.

19. A method of correcting defective pixel values, comprising:
converting light provided from a subject into an electrical signal using an image sensor comprising a plurality of pixels, and outputting image data corresponding to the electrical signal;
reading location information, which is encoded, about one or more defective pixels among the pixels, from a data memory;
decoding the encoded location information about the defective pixels;
identifying the defective pixels from the pixels using the decoded location information; and
interpolating pixel values of the defective pixels using at least one pixel value of one or more neighboring pixels adjacent to each of the defective pixels,
wherein the decoding the encoded location information about the defective pixels comprises selecting one of a first decoding method and a second decoding method based on a distance between the defective pixels, and decoded the encoded location information about the defective pixels using the selected decoding method.

20. The method of claim 19, wherein the distance between the defective pixels is a distance between defective pixels adjacent to each other in a horizontal scan order, wherein the encoded location information comprises, as a unit, non-compressed horizontal coordinate information and compressed vertical coordinate information, wherein the location information decoder is configured to select one of the first and second decoding methods by reading a predetermined number of bits from a front of the encoded location information, and wherein the first and second decoding methods are different from each other by a type of data read by the location information decoder from the encoded location information.

\* \* \* \* \*